FIG. 1
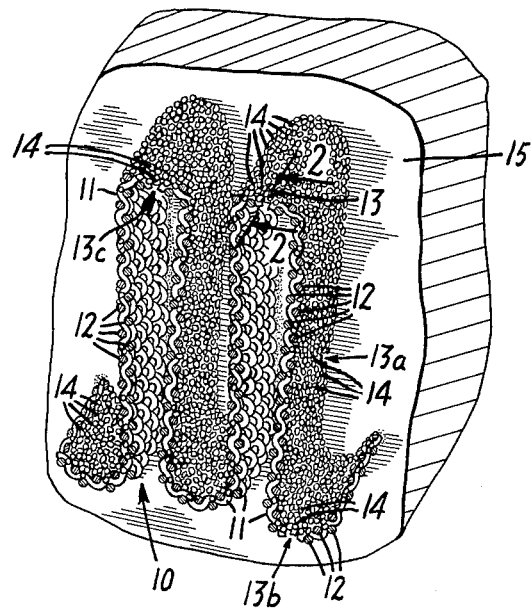
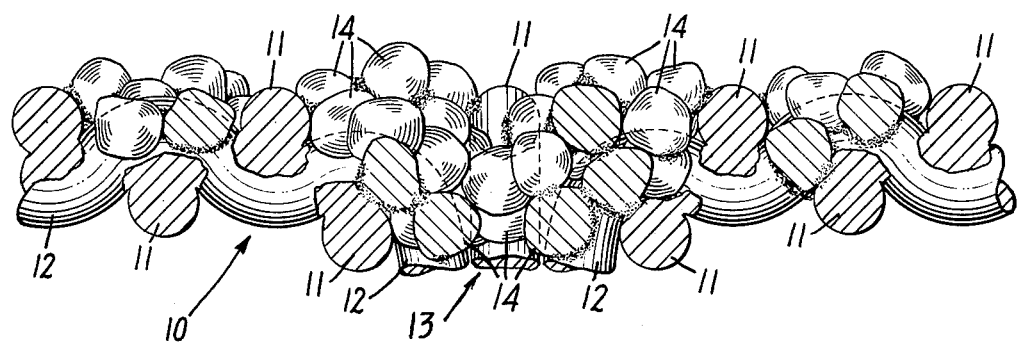
FIG. 2

United States Patent Office 3,241,681
Patented Mar. 22, 1966

3,241,681
FILTER ELEMENTS
David B. Pall, Roslyn Estates, N.Y., assignor to Pall Corporation, Glen Cove, N.Y., a corporation of New York
Original application Feb. 9, 1959, Ser. No. 791,848, now Patent No. 3,061,917, dated Nov. 6, 1962. Divided and this application Aug. 31, 1961, Ser. No. 136,975
3 Claims. (Cl. 210—493)

This application is a division of Serial No. 791,848, filed Feb. 9, 1959, now U.S. Patent No. 3,061,917, issued Nov. 6, 1962, which was itself a continuation-in-part of Serial No. 562,127, filed Jan. 30, 1956, now U.S. Patent No. 2,925,650, issued on Feb. 23, 1960 and Serial No. 671,586, filed July 12, 1957, now U.S. Patent No. 3,049,796, issued Aug. 21, 1962.

This invention relates to mended mesh filter elements having an average pore diameter less than about 50 microns, and, more particularly, to metal filters having metal powder sintered-bonded to a metallic fine mesh filter element to cover over excessively large apertures therein having diameters of the order of 150 microns or less.

It has been proposed heretofore, in U.S. Patent No. 2,457,051, to Le Clair, to prepare filters by sucking through a wire gauze or screen a suspension of metal particles larger in size than the mesh size of the gauze or screen, so that they are caught thereon, and then sinter-bonding this layer to the gauge or screen. This process relies upon the mesh as a filter to support the layer of powder, and this layer is intended to and does reduce the overall porosity of the base. It also increases the thickness of the base, and of the final filter. The fluid suspending medium is of quite low viscosity; the fluids disclosed are water and carbontetrachloride. Because of these factors, the method as described in the patent is not practical for the mending of oversize holes, larger in diameter than the particles used to mend them, in filters of exceptionally small pore size, not larger than about 50 microns, down to 5 microns in diameter, and less. As a base layer, the patented process used particles larger in diameter than the largest hole.

The preparation of mesh filter elements of such small pore size, with a high degree of uniformity and maximum structural rigidity, is described in copending U.S. applications Serial No. 562,127, filed Jan. 30, 1956, now U.S. Patent 2,925,650, issued Feb. 23, 1960, and Serial No. 671,586, filed July 12, 1957, now U.S. Patent No. 3,049,796, issued Aug. 21, 1962. In the preparation of these filters the contiguous portions of the filaments are flattened by rolling, pressing, or coining the filtering screen with pressure applied perpendicularly to its faces, thereby forming contiguous flattened areas at the contact surfaces of adjacent filaments. Maximum structural rigidity is imparted by sinter-bonding the wire mesh filaments at their points of contact.

In order to provide maximum surface area in a small space, the filter screens are corrugated, pleated, or folded into a variety of shapes. Corrugated, pleated, or folded filter elements having deep corrugations present a greater effective filter area and possess a greater capacity for impurities than those having shallower corrugations.

Unfortunately, however, the pleating, corrugating, or folding of the screens, and subsequent operations required to assemble them into a finished filter element joined to an appropriate connection at one end, and generally with an appropriate closure at the opposite end, is nearly always accompanied by the introduction of abnormally large apertures. For example, after corrugating the screen, the corrugated structure is rolled to form a cylinder and the ends of the screen welded together; this axial weld is often not perfect so that abnormally large apertures will generally be found in this weld. Similarly, when the ends of the corrugated cylinder are welded to the appropriate end fittings, apertures are found to exist due to incomplete welding. In one of the most useful methods for assembling end connections to a corrugated cylinder, the corrugations are compressed locally at the ends to form a high density structure in order to facilitate welding to the end connections. During the densification operation, some large apertures tend to be developed in the screen, particuarly in the location of the axial weld. The result is that, with a mesh having a nominal opening of 13 microns, for example, the assembled filter element may have a large number of apertures greater than 15 microns when assembled caused by faults both originally present in the mesh and introduced during the corrugating and sintering operations. Inasmuch as the formation of these oversize holes can not be avoided, it is necessary to mend them in order to produce a filter having the desired maximum pore opening. Heretofore this mending has required a separate hand operation for each pore, which is both expensive and slow and considerably reduces the rate of production of filters of this type, effectively limiting their usefulness to special applications where cost is not a factor.

Furthermore, it has not heretofore been possible to obtain mended filters having an all stainless structure. For example, when the aperture occurs in the internal portions of a fold of the filter element, it is not accessible for welding, or for repair, by any other means known at this time by which an all stainless steel overlay can be applied. For this reason, it has been necessary to resort to such methods as applications of resinous materials, brazing alloys of composition different from the parent material, and other similar methods to accomplish such repairs, obviously less desirable than all-stainless steel repair.

In accordance with the invention, therefore, there are provided fine mesh filter elements having an average pore diameter less than about 50 microns and having any oversize holes mended without substantial reduction of the porosity of the filter or increase in the overall size of the filter. The powdered material is sinter-bonded to the filaments of the mesh filter, and is preferably of the same composition as the material forming the filaments. The filters of the invention have a base mesh of interwoven metallic filaments disposed in fixed relative positions to define a series of pores through the mesh, the surfaces of the filaments being joined by sintered integration of the metal at their points of juncture, the randomly spaced interstices or oversized pores between the filaments being partially closed off to the average pore size with particles sinter-bonded to the filaments and to each other. Such filters are prepared as disclosed in Patent No. 3,061,917.

The process described in U.S. Patent No. 3,061,917 is applicable to mesh filters formed of any metal but is particularly useful in mending filters made of stainless steel mesh. The use of stainless steel powder in mending such a filter makes possible a product of uniform porosity, very desirable acid resistance, and high strength. It is also possible to apply the process described in U.S. Patent No. 3,061,917 to mesh filters of copper, brass, iron, nickel, aluminum, and titanium and various alloys, all of which are well known to those skilled in the art.

Normally, the metal powder used for mending is of the same metal as the filaments of the mesh filter. However, this is not essential and special effects can be obtained by applying a powder of a different metal or alloy to the mesh filter base.

The particle size of the powder is not critical. Surprisingly, powder much smaller in particle size than the diameter of the largest openings in the filter which are to be closed over will collect at the larger holes which are to be mended. For example, holes as large as 100 microns in diameter will be completely closed over, using suspensions of particles 90% or more of which are in the size range 30 to 50 microns. The reason for the efficiency of these suspensions in closing over the large apertures is thought to be as follows: When the powder suspension is drawn through the filter, a greater proportion of the suspensions can and does flow through openings of larger size, with the result that a number of particles reaching the opening at the same time will wedge or "jam" over the opening, after which subsequent particles reaching this area will coat it with a thickness of powder substantially equal to that which is collected on the other surfaces of the filter element.

It will be seen from this that in addition to the particle size of the powder used, the reduction in porosity of the filter is a function of the rate of flow of the suspension through the filter and of the time allotted to the mending operation together with the total content of particles suspended in the solution. Because of the interdependence of these factors on each other and upon the diameter of the openings in the screen, it is impossible to set forth any exact conditions which are applicable to every type of filter. It will be apparent, however, that very little experimentation will be needed to select conditions appropriate to the need.

The most desirable coating thickness has been found to be represented by a coating of which the weight in grams per square foot is approximately equal to the particle size range of the powder used. For example, when the powder used is in the range 30 to 50 microns, the best results are obtained by applying 30 to 50 grams per square foot of filter area. Applying less than this quantity tends to allow large openings to remain open; applying more than this amount merely decreases permeability to fluids with no accompanying benefit.

The particle size of the powder suspension used for accomplishing the repair can be such that the powder collected on the filter surface does not greatly change permeability or filtration characteristics. It is equally possible by use of an appropriate powder size, relative to the pore diameter of the filter, to diminish the average pore diameter of the filter, whereby a finer overall filter structure is obtained.

Mesh filters tend to lose their usefulness, due to development of excessively high pressure drop, when actual hole size falls below 8 microns. Hence, while this invention can include filters with hole size below 8 microns, in practice it is usually not applied outside the range of actual hole size equal to 8 to 50 microns.

In general, it can be said that the powder particles may have a maximum diameter not less than half the diameter of the largest oversize opening in the screen, but usually not in excess of about 75 microns, and they should be up to about five times the average diameter, of the normal size pore openings in the screen. The lower limit is not critical. The particles can be smaller than the average screen pore diameter if the oversize openings are relatively small. The process described in U.S. Patent No. 3,061,917 can be used to repair holes from five to ten times the diameter of the average hole in a filter. For a normal hole size of 20 microns, all holes present in a filter element larger than approximately 100 and some up to 200 microns can be repaired. However, if a hole is present in the element which is 300 microns or more in diameter, the repair method would not be effective in closing over this particular hole, but this hole could be closed manually. Hence, a substantial advantage is still obtained by applying the method to elements having a few holes considerably larger than the largest repairable by the method, since the amount of time required for manual repair of the element is substantially reduced by the elimination of all holes smaller than the very largest ones.

The concentration of powder in the suspension should be within the range of 0.25 to 5.0%, preferably from 0.5 to 2.5%.

The viscosity of the suspension is of importance, and should be considerably greater than the viscosity of water. Viscosities within the range of 2 to 1000 centipoises, measured at the temperature of application, have been found to be partially satisfactory. Preferably, the viscosity is from 10 to 100 centipoises for best results. The process has been conducted, although with a considerably less satisfactory product, using fluids with viscosities as low as one centipoise. When viscosity is too low, holes which would otherwise be closed over tend to remain open, and in addition the coating tends to be very non-uniform, yielding a far less satisfactory product.

The fluid used to suspend the powder may be one which has too low a viscosity at room temperature, but which has the desired viscosity at low temperature. If the powder is suspended in such a fluid and cooled to low temperature and the then viscous fluid is passed through the filter element, the advantages of the high viscosity are obtained. When the required amount of fluid suspension has been passed through the filter element, the filter element can be removed and warm air passed through it while it is sucked dry. In this way, a minimum of fluid is retained in the filter element, since the viscosity of fluid at the end of the drying operation is low. Similarly, a suspension in a fluid having the desired moderate to high viscosity at room temperature can be used, and the element subsequently sucked dry by passing hot air through it, whereby the viscosity of the suspending solution is substantially reduced.

The fluid can be an organic liquid which has the requisite viscosity at the temperature of operation, such as ethylene glycol, glycerin, polyethylene, and polypropylene glycols of low to medium molecular weight, and motor lubricating oils derived from petroleum, SAE 20 to 50. The fluid also can be one of too low viscosity, such as water or low viscosity lubricating oil, whose consistency is increased by a thickening agent.

Any viscosity-increasing agent soluble in the fluid can be used. Carboxymethyl cellulose, methyl cellulose, hydroxyethyl cellulose and similar water soluble cellulosic derivatives are quite satisfactory. Water-soluble gums, such as the alginates, locust bean-gum, guar gum and carob gum are also satisfactory. Water-soluble synthetic resins can also be used. Polyacrylic acid, polymethylacrylic acid, polymethylmethacrylic acid and polymethacrylic acid, polyvinyl alcohol, partially hydrolyzed polyvinyl acetate and polyacrylamide are quite satisfactory. Oil-soluble polymeric viscosity increasers such as Paratac and Vistanex also are useful.

The powder suspension is readily prepared by suspending the powder in the desired amount in the previously prepared viscous fluid. It is very important to obtain uniformity so as to insure even deposition upon the mesh filter. Mechanical stirring is quite desirable and the stirring apparatus should be quite efficient and reach every portion of the solution to insure uniformity.

The powder suspension can be drawn through the mesh filter either horizontally or vertically. Downward flow is possible but it is preferable to conduct the deposition by upward flow through the filter at a rate exceeding the settling rate of the metal powder in the solution.

Subsequent to drying, the coated filter is passed through a furnace in reducing atmosphere, at a temperature below the melting point of the metal of which the element is composed. If two metals are present, the melting point of the lower melting metal is the upper limit.

When the fluid and/or thickening material employed is organic in nature, it contains a substantial proportion of carbon. If a significant amount of the suspending fluid is allowed to remain upon metal powder, in the case of stainless steel and other metals, some of the carbon can be picked up by the metal during sintering. This is particularly undesirable in the case of stainless steel since the metal then becomes sensitized to intergranular corrosion because of its high carbon content.

In order to avoid this, the fluid can be washed from the powder before sintering simply by drawing water or ethyl alcohol or other low viscosity solvent therefore through the assembly. The powder remains sufficiently adhered in position to permit normal handling of the filter until sintering is complete. A solvent for the thickening agent can be used to wash out the agent, with the same result.

The washing step is unnecessary when there is little holdup or when the thickening agent is used in a small concentration, less than about 0.2%. The amount of agent remaining on the surface of the powder and, correspondingly, the amount of carbon added to the stainless steel, is then so small as to be truly negligible.

No powder is collected on non-porous portions of the filter element. The finished structure presents a very neat appearance, due to absence of resin repair areas or of brazed areas.

Suspensions in fluids having viscosities as low as that of water, or suspensions in water itself, give coatings which are non-uniform, compared to those obtained using the more viscous solutions of the invention.

An important characteristic of filter elements is dirt capacity. A specific definition of dirt capacity is provided by Military Specification Mil–F–5504A, in which Standard U.S. Army Air Cleaner Test Dust (A.C. first test sheet) is suspended in hydraulic fluid and passed through the filter element until a differential pressure of 40 p.s.i. is reached.

Inasmuch as the metal particles deposited on the filaments of a filter provide a large surface area on which impurities can be trapped, filters prepared according to the process described in U.S. Patent No. 3,061,917 have a much higher dirt capacity than has the starting material. In many cases, the dirt capacity of a filter is increased by a factor of five by the use of this process, in spite of the fact that the starting (clean) pressure drop across the coated filter element is higher than the uncoated element. In addition, because the diameter of the largest openings is reduced, removal of smaller impurities is possible. Because of the improved dirt capacity, it has been found possible to design filters prepared in accordance with the invention for use in hydraulic systems for a period of a year or more without cleaning.

FIGURE 1 is an enlarged perspective view of a portion of a mended filter mesh element in accordance with this invention, comprising a sintered metal mesh filter of substantially uniform pore size wherein oversized pores between certain filaments have been reduced to the average pore size by metallic particles deposited in said oversized pores and sinter-bonded to each other and to the filaments at their points of contact.

FIGURE 2 is a cross-sectional view taken along line 2—2 of FIGURE 1, to a greatly enlarged scale, showing the filaments partly broken-away at their points of juncture to show the sintered integration thereof; sinter-bonding of the particles to each other and to the filaments at their points of contact is shown by means of stippling.

The filter element of FIGURE 1 is a metallic gauze or wire mesh 10 having weft 11 and warp 12 filaments of stainless steel, sintered at their points of juncture. Certain of the filaments define therebetween oversized pores 13, 13a, 13b, and 13c. The oversized pores at 13, 13b, and 13c are shown at the apices of two corrugation folds of the wire mesh, while the oversized pore shown at 13a arose from a break in the mesh at the weld whereby the wire mesh is attached to the end cap 15 of the filter element, as can happen when an edge portion of the mesh breaks, or is otherwise imperfect. In each of these instances the oversized pores at 13, 13a, 13b, and 13c are reduced to substantially the uniform pore size by metallic particles 14 deposited therein and on the filaments 11 and 12 adjacent thereto, sinter-bonded to each other and to the filaments, reducing the size of the oversized pore to substantially the uniform pore size of the remaining pores of the filter element, as is shown in greater detail in FIGURE 2.

The following example is illustrative:

*Example*

A filter element was prepared in accordance with U.S. Patent No. 2,925,650, composed of stainless steel mesh having an average opening diameter of 13 microns, and having a filter area of 0.2 square foot. This filter was tested by the Bubble Point Test described in WADC Technical Report 56–249 entitled "Development of Filters for 400° F. and 600° F. Aircraft Hydraulic Systems" (Wright Air Development Center, May 1956) and was found to have approximately twenty holes ranging from 30 to 100 microns in diameter.

An aqueous solution of polyacrylic acid (C934-Goodrite) was prepared. The resulting solution had a viscosity of 5 centipoises at 25° C., the room temperature of operation, as determined by a capillary viscometer. To the solution was added stainless steel powder ranging from 30 to 50 microns in diameter to form a 2.5% suspension by weight in the solution. While being strongly agitated, this suspension was drawn through the mesh filter upwardly at a rate of 4 gallons per minute for fifteen seconds, after which air was sucked through the filter for about 10 seconds, and the element was then dried. Thereafter the composite filter element was sinter-bonded at 1270° C. The finished filter was subjected to the Bubble Point Test again. The largest opening was then found to be 15 microns in diameter.

Initially, the pressure drop across the filter when passing 4.2 gallons per minute of hydraulic fluid was 6 p.s.i.; the pressure drop across the finished filter was 9.5 p.s.i.

Dirt capacity measurements were made on the filter element using the procedure of Military Specification No. MIL–F–5504 and proposed Specification MIL–F–8815. U.S. Army Standard Fine Air Cleaner Test Dust was added while flowing MIL–H–5606 hydraulic fluid through the element at 4.2 p.s.i. until a differential pressure 40 p.s.i. was developed. The dirt capacity of the finished filter in accordance with this invention was found to be approximately one and one half times as great as that of the unmended filter. When the test was continued up to 90 p.s.i. differential, a figure which is proposed for use in Military Specification MIL–F–8815, the dirt capacity after repair was approximately twice that before repair.

The removal efficiency of the final mended filter measured in accordance with the procedure of proposed Military Specification MIL–F–8815 was 96% compared with approximately 75% for filters made of the same mesh in the same way except mended using localized applications of epoxy resin to areas having oversize holes. When elements were made up using a finer starting mesh, such that after repair by the resin method they had efficiency equal to 94%, they had approximately one-fifth of the dirt capacity of mended filter elements in accordance with this invention.

I claim:

1. A mended filter element comprising a base mesh of interwoven metallic filaments, said filaments being disposed in fixed relative positions and sintered at their points of juncture to define therebetween a series of pores, said pores having an average pore size from about 8 to about 50 microns, certain of said filaments in said base mesh defining therebetween oversized pores of up to ten times said average pore size, said oversized pores being randomly spaced within said base mesh, metallic particles deposited on said certain filaments and sinter-bonded to each other and to said certain filaments in an amount sufficient to reduce the size of said oversized pores to substantially the average pore size, said metallic particles each having a maximum size less than half the size of the largest of said oversized pores, the filaments defining the pores of average pore size being relatively free from metallic particles which appreciably reduce the average pore size.

2. A filter element according to claim 1 in which the metallic filaments are stainless steel.

3. A filter element according to claim 1 wherein the metallic filament mesh is corrugated.

References Cited by the Examiner
UNITED STATES PATENTS

| | | |
|---|---|---|
| 2,457,051 | 12/1948 | Le Clair. |
| 2,826,309 | 3/1958 | Forman _____ 210—510 X |
| 2,979,400 | 4/1961 | Mouwen _____ 210—510 X |

REUBEN FRIEDMAN, *Primary Examiner.*

HARRY B. THORNTON, ALEXANDER WYMAN,
*Examiners.*